United States Patent [19]
Masuyama

[11] Patent Number: 5,283,901
[45] Date of Patent: Feb. 1, 1994

[54] MICROCOMPUTER WITH HIGH SPEED ACCESS MEMORY AND LANGUAGE PROCESSING PROGRAM EXECUTION SYSTEM

[75] Inventor: Hiroyuki Masuyama, Tokyo, Japan

[73] Assignee: NEC Corporation, Tokyo, Japan

[21] Appl. No.: 864,605

[22] Filed: Apr. 7, 1992

[30] Foreign Application Priority Data

Apr. 9, 1991 [JP] Japan ................... 3-104878

[51] Int. Cl.$^5$ ............ G06F 3/00; G06F 5/00; G06F 12/00
[52] U.S. Cl. .................... 395/700; 395/650; 364/966.1; 364/967.4; 364/973; 364/280.4; 364/280.5
[58] Field of Search ........... 395/650, 700; 364/300, 364/200

[56] References Cited

U.S. PATENT DOCUMENTS

| | | | |
|---|---|---|---|
| 4,782,444 | 11/1988 | Munshi | 364/300 |
| 4,897,780 | 1/1990 | Lakness | 364/200 |
| 5,043,870 | 8/1991 | Ditzel | 364/200 |
| 5,146,594 | 9/1992 | Litsuka | 395/700 |
| 5,161,216 | 11/1992 | Reps | 395/375 |

Primary Examiner—Kevin A. Kriess
Assistant Examiner—Richard Smedley
Attorney, Agent, or Firm—Whitman & Marhoefer

[57] ABSTRACT

A microcomputer having a high speed access memory and a language processing program execution system capable of producing a compact object including a high speed variable operation is disclosed. As to an input source program, variable areas used by subroutines are calculated by a variable area analyzing part, and a flow graph of an interrelation of callings of the subroutines is produced by a flow graph producing part. Then, the maximum variable area used by a whole program is calculated from the sizes of the variable areas and the flow graph by a maximum variable area detecting part. When the calculated maximum variable area size of the whole program is smaller than the memory size of the high speed access memory, an output part outputs the object information with variables allocated in the high speed access memory.

2 Claims, 4 Drawing Sheets

FIG. 4

```
1:   void main()
2:   {
3:       int total, data1, data2;
4:
5:       total = data1 + data2;
6:   }
```
— 400

FIG. 5

```
movw    ax,[hl]
movw    bc,ax
movw    ax,[hl+2]
addw    ax,bc
movw    [hl+4],ax
```
— 500

FIG. 6

```
movw    ax,HR02
addw    ax,HR03
movw    HR01,ax
```
— 600

MICROCOMPUTER WITH HIGH SPEED ACCESS MEMORY AND LANGUAGE PROCESSING PROGRAM EXECUTION SYSTEM

BACKGROUND OF THE INVENTION

The present invention relates to a microcomputer including a language processing program execution system for the microcomputer having a high speed access memory of a particular memory area which data can be written in and read out of at a high speed by instructions.

DESCRIPTION OF THE PRIOR ART

In a language processing program, conventionally, an input source file is translated or compiled to obtain a file such as an object module (hereinafter referred to as an object).

When a microcomputer is designed, inexpensive chips are used to minimize cost, and as a result, its performance is not optimum. Hence, when a program is developed, high speed execution and a small size of an object of a language processing result are needed.

Generally, in a microcomputer, it is usually provided with a memory area accessed by a short instruction code, which is called a high speed access memory. Since this memory can be accessed by the short instruction code, an instruction byte number can be reduced, and, since an instruction fetch and an instruction decoding can be performed at a high speed, an instruction execution time can be reduced.

In a conventional language processing program execution system, even when the microcomputer has the high speed access memory, the high speed access memory is small in memory size compared with a usual memory, and, since a memory allocation is not considered, all variables are allocated in the usual memory.

In the conventional language processing program execution system, as described above, the variables are allocated not in the high speed access memory but in the usual memory.

In general, since the reading and writing speed of the data in the usual memory is considerably lower than those in the high speed access memory, an object including a high speed variable operation can not be produced in the conventional language processing program execution system. Furthermore, since the byte number of the object code read from and written in the usual memory is generally larger than the same of the high speed access memory, a compact object code capable of being stored in the limited high speed access memory can not be generated.

SUMMARY OF THE INVENTION

It is therefore an object of the present invention to provide a microcomputer having a high speed access memory and a language processing program execution system capable of producing a compact object code including a high speed variable operation.

In accordance with one aspect of the present invention, there is provided a microcomputer having a high speed access memory capable of reading out and writing in data at a high speed and a language processing program execution system for analyzing information of an input source program and outputting object information, the language processing program execution system comprising variable area analyzing means for calculating variable areas used by subroutines of the source program; flow graph producing means for producing a flow graph of an interrelation of callings of the subroutines; maximum variable area detecting means for calculating a maximum variable area used by a whole program from sizes of the variable areas calculated by the variable area analyzing means and the flow graph produced by the flow graph producing means; and output means for outputting the object information with variables allocated in the high speed access memory, when the maximum variable area calculated by the maximum variable area detecting means is smaller than a memory area of the high speed access memory.

According to the present invention, as to the input source program, the variable areas used by the subroutines are calculated by the variable area analyzing part, and the flow graph of the interrelation of callings of the subroutines is produced by the flow graph producing part. Then, the maximum variable area used by the whole program is calculated from the sizes of the variable areas and the flow graph by the maximum variable area detecting part. When the calculated maximum variable area size of the whole program is smaller than the memory size of the high speed access memory, the output part outputs the object information with variables allocated in the high speed access memory.

Hence, according to the present invention, the compact object including the high speed variable operation can be produced.

BRIEF DESCRIPTION OF THE DRAWINGS

The objects and features of the present invention will become more apparent from the consideration of the following detailed description taken in conjunction with the accompanying drawings in which:

FIG. 4 shows a source program used in the microcomputer shown in FIG. 1;

FIG. 5 shows an object code whose variables are allocated in a usual memory, produced from the source program shown FIG. 4; and FIG. 6 shows an object code whose variables are allocated in a high speed access memory, produced from the source program shown in FIG. 4.

DESCRIPTION OF THE PREFERRED EMBODIMENT

Figure 1:
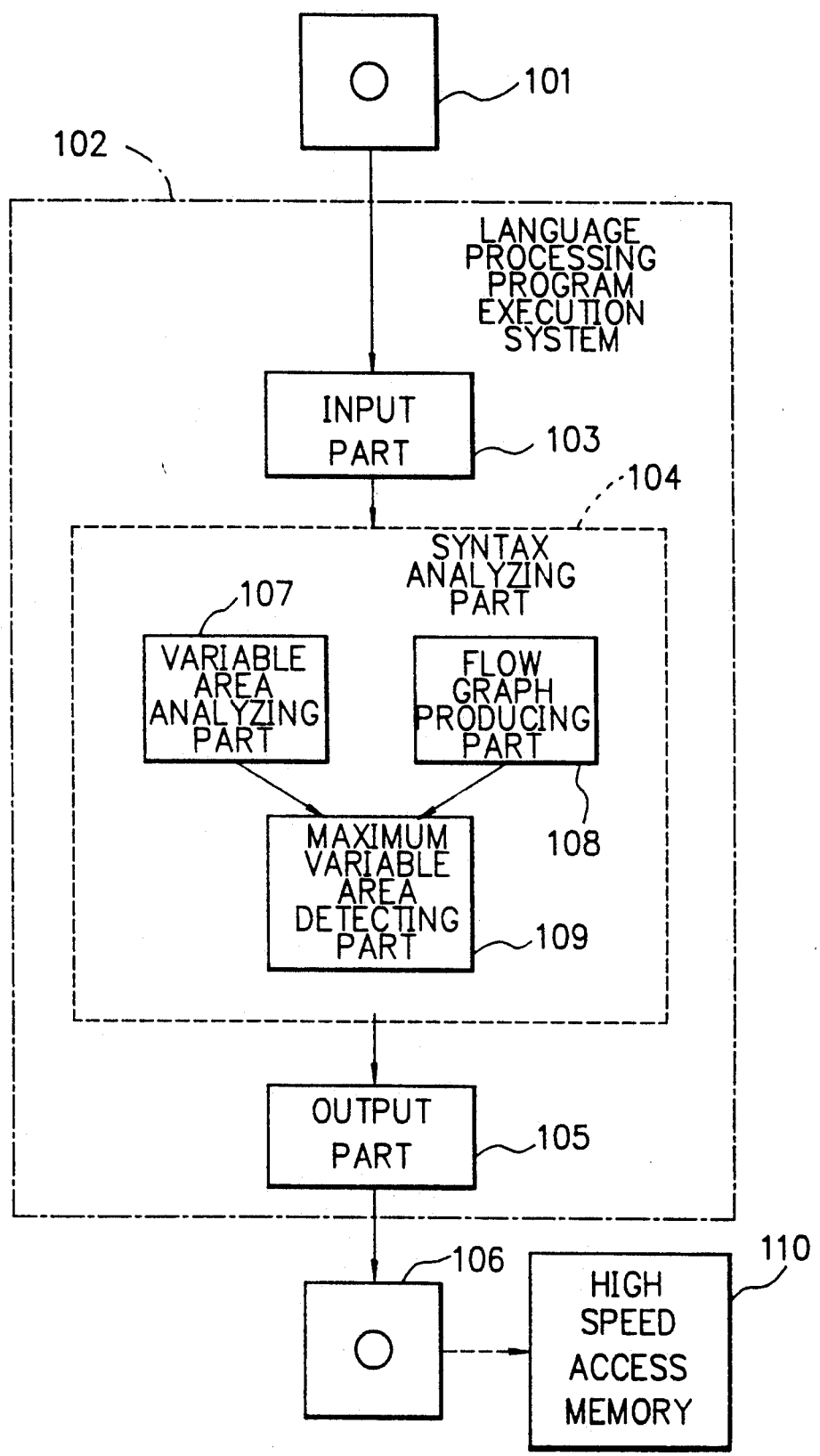
FIG. 1 is a block diagram of a microcomputer according to the present invention.

Referring now to the drawings, a description will be given of an embodiment of a microcomputer in accordance with the present invention.

There is shown in FIG. 1 one embodiment of a microcomputer according to the present invention. In this embodiment, the microcomputer comprises a language processing program execution system 102 and a high speed access memory 110 in which data can be read out of or written in at a high speed by instructions. The language processing program execution system 102 includes an input part 103 for inputting source program information from an input file 101, a variable area analyzing part 107 as a variable area analyzing means for calculating variable areas used for subroutines of the source program, a flow graph producing part 108 as a flow graph producing means for producing a flow graph exhibiting an interrelation of callings of the subroutines, a maximum variable area detecting part 109 for calculating the maximum variable area used for the entire program from the size of the variable areas calculated in the variable area analyzing part 107 and the flow graph produced in the flow graph producing part 108, and an output part 105 for outputting the object information where the variables are to be allocated in the high speed access memory 110 when the calculated maximum variable area is smaller than the memory area of the high speed access memory 110, to an output file 106. The variable area analyzing part 107, the flow graph producing part 108 and the maximum variable area detecting part 109 constitute a syntax analyzing part 104.

Next, the operation of the microcomputer described above will now be described in detail. In this case, function calls in the subroutines exclude any recursive call and the handling variables are restricted to only the variables within the subroutines.

The processing of the variable area analyzing part 107 can be implemented by diverting the processing performed in a syntax analyzing part of a known language processing program, and the processing of the flow graph producing part 108 can be also implemented by the information output from the syntax analyzing part of the known language processing program.

Figure 2:
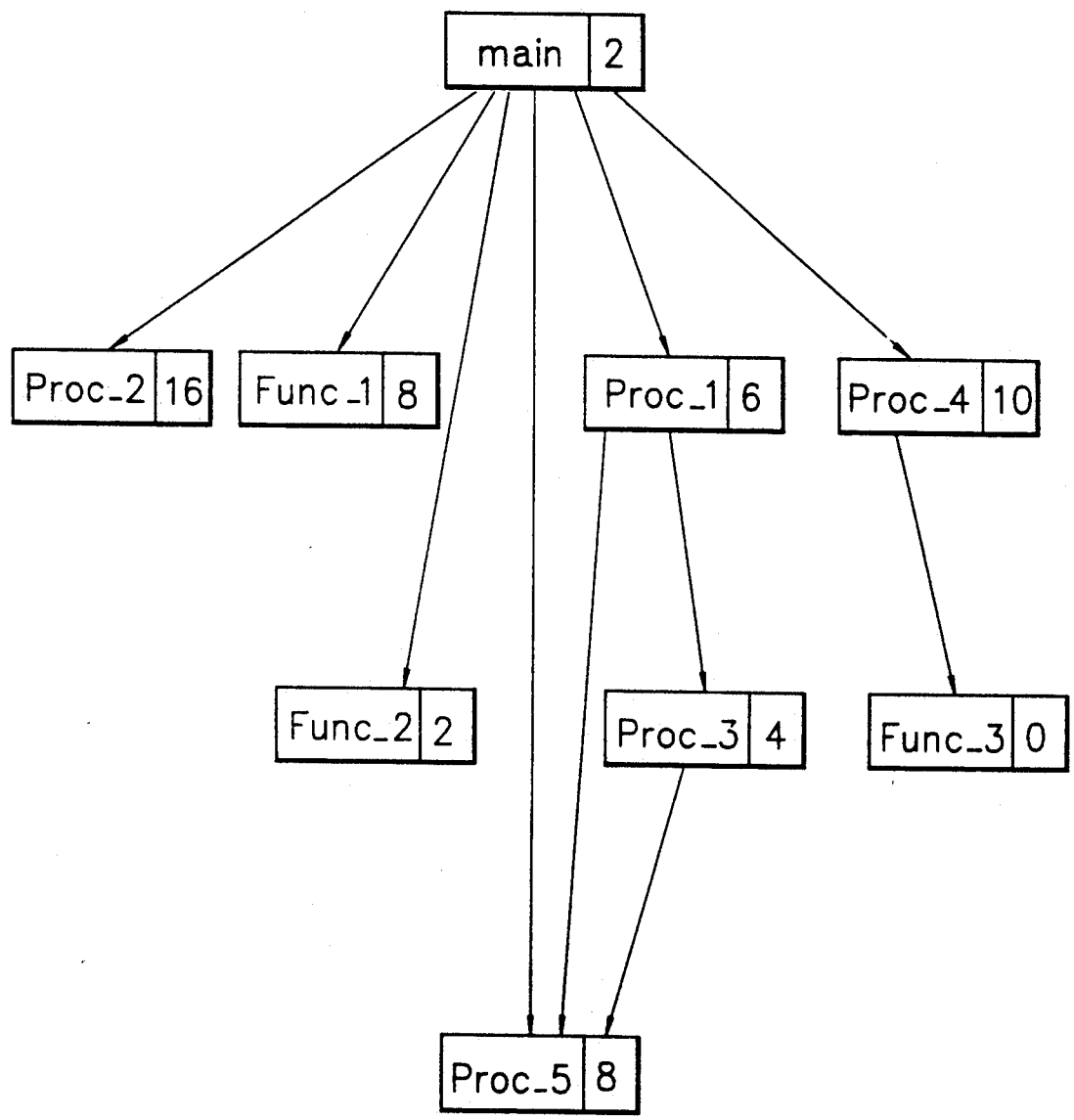
FIG. 2 is a flow graph obtained in a variable area analyzing part and a flow graph formation part of the microcomputer shown in FIG. 1.

FIG. 2 shows a flow graph of the sizes of the variable areas of the subroutines and the function calls produced in the variable area analyzing part 107 and the flow graph producing part 108. In the flow graph, symbols such as main, Proc-1 to Proc-5 and Func-1 to Func-3 denote names of subroutines and numbers such as 0, 2, 4, ... indicate the sizes of the variable areas of the subroutines. The unit of the variable area sizes is byte.

Figure 3:
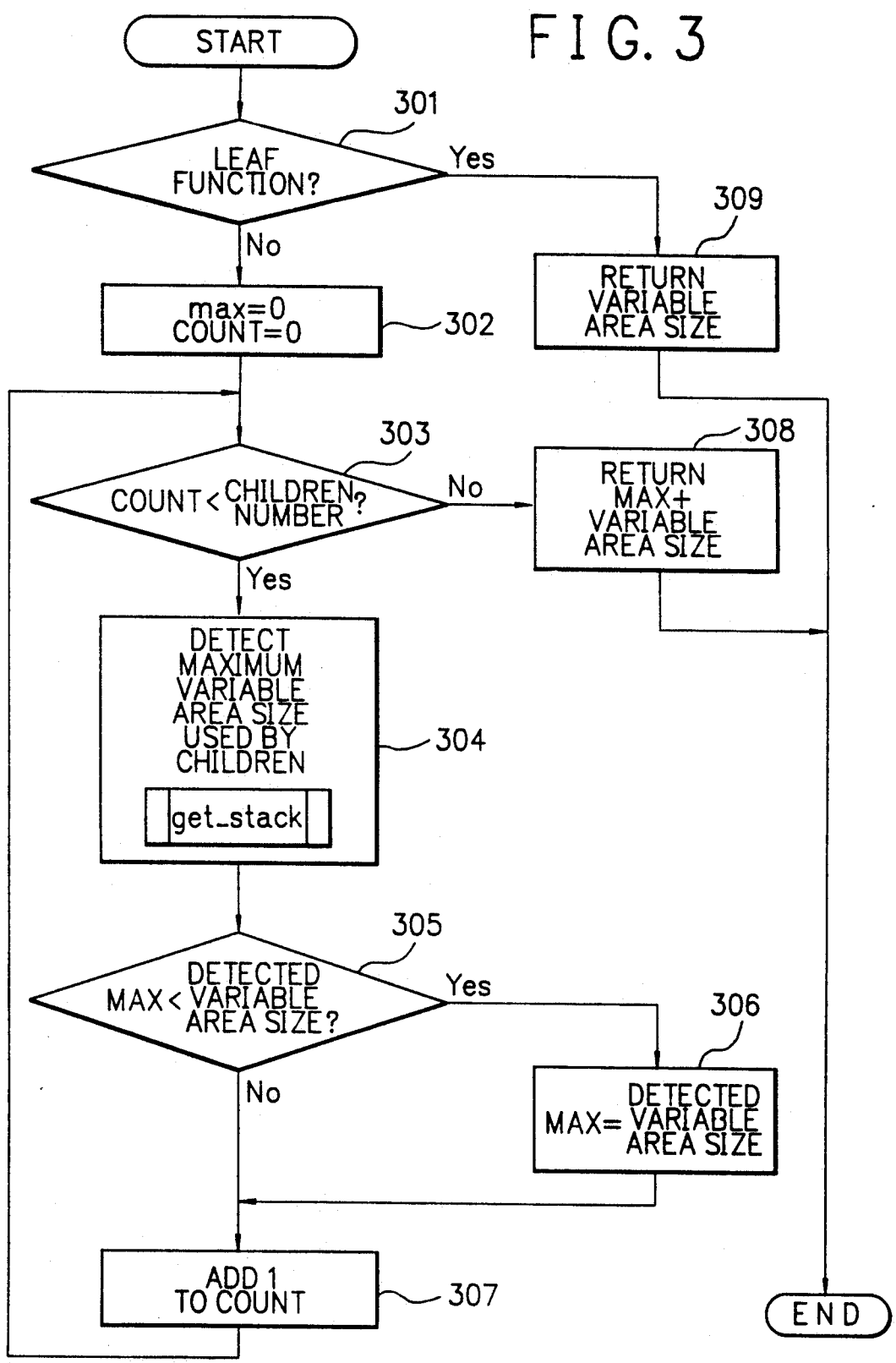
FIG. 3 is a flow chart showing a processing in a maximum variable area detecting part of the microcomputer shown in FIG. 1.

FIG. 3 shows a flow chart of the processing in the maximum variable area detecting part 109 shown in FIG. 1.

In this embodiment, the name of the process routine in the maximum variable area detecting part 109 is designated get-stack, and the flow graph shown in FIG. 2 is considered as the input information of the maximum variable area detecting part 109. Further, a side calling a function is called a parent and a side that a function is called is called a child. A function having no function to be called is called a leaf function. For example, in FIG. 2, Proc-1 is the child of the main and is the parent of Proc-3, and Proc-5 is the leaf function.

The maximum variable area detecting routine get-stack is started from the main and performs the processing in recursive until it reaches the leaf function. When the routine is the leaf function, the get-stack returns the variable area size that the leaf function uses. In turn, when the routine is not a leaf function, it is moved to its child or children and the variable area of each subroutine is calculated. As a result, the maximum value is returned as the variable area size of the routine.

The flow graph produced by the variable area analyzing part 107 and the flow graph producing part 108 is processed in the process shown in FIG. 3 in the maximum variable area detecting part 109.

Now, the processing is started, in a leaf function discrimination processing step 301, it is discriminated whether or not the routine presently processed is the leaf function. When the present routine is the leaf function, it is moved to a variable area return processing step 309, and in the variable area return processing step 309, the size of the variable area of the present routine is returned to finish the processing of the present routine. When the present routine is not a leaf function, it is moved to an initialization processing step 302. In the initialization processing step 302, a memory area for storing the maximum size of the variable area used by the child or children, hereinafter referred to as "max", and a memory area for counting the number of the children, hereinafter referred to as "count" are initialized to zero.

Then, in a children number discrimination processing step 303, it is discriminated whether or not the count is smaller than the number of the children. When the count is not smaller than the number of the children, it is discriminated to finish all processings for the child or children, and the routine is moved to a variable area return processing step 308. In the variable area return processing step 308, the sum of the max and the size of the variable area of the present routine is returned to finish the processing of the present routine. When the count is smaller than the number of the children, the routine is moved to a variable area detection processing step 304. In the variable area detection processing step 304, in order to detect the maximum size of the variable area used by the child or children, a recursive calling of the get-stack is carried out.

Then, in a variable area discrimination processing step 305, it is discriminated whether or not the variable area size detected in the variable area detection processing step 304 is larger than the max. When the variable area size detected in the step 304 is larger than the max, the routine is moved to a variable area determination processing step 306. When the variable area size detected in the step 304 is not larger than the max, the routine is moved to a children number count processing step 307.

In the variable area determination processing step 306, the variable area size detected in the variable area detection processing step 304 is determined to the max. In the children number count processing step 307, 1 is added to the content of the count, and the obtained value is returned to the children number discrimination processing step 303. Then, the operation of the steps 303 to 308 is repeated until the count is not smaller than the number of the children in the children number discrimination processing step 303 to finish all processings for the child or children and the routine is moved to a variable area return processing step 308 to finish the processing of the present routine, as described above.

Next, when the flow graph shown in FIG. 2 is inputted to the maximum variable area detecting part 109, the processing for returning 20 as the maximum size of the variable area of the routine main will now be described in detail.

First, in the first level, in order to calculate the maximum value of the variable area to be used by the routine main, the variable areas of six children such as Proc-1, Proc-2, Proc-4, Proc-5, Func-1 and Func-2 of the parent main are calculated, and the maximum size of the calculated six variable areas is added to the variable area size of the routine main to obtain the maximum size of the variable area used by the routine main.

In the second level, since the routines Proc-2, Proc-5, Func-1 and Func-2 are the leaf functions, these variable area sizes 16, 8, 8 and 2 are returned, respectively. Then, in order to calculate the maximum value of the variable area used by the routine Proc-1, the variable areas of two children such as Proc-3 and Proc-5 of the parent Proc-1 are calculated, and the maximum size of the calculated two variable areas is added to the variable area size of Proc-1 to result the maximum size of the variable area used by the routine Proc-1. For the routine Proc-4 and its child Func-3, the maximum size of the variable area used by the routine Proc-4 is calculated in the same manner as described above.

In the third level, since the routines Proc-5 and Func-3 are the leaf functions, these variable areas sizes 8 and 0 are returned, respectively. Then, in order to calculate the maximum value of the variable area used by the routine Proc-3, the variable area of one child of Proc-5 is calculated, and the variable area size of Proc-5 is added to the variable area size of Proc-3 to obtain the maximum size of the variable area used by the routine Proc-3.

In the fourth level, since the routine of Proc-5 is the leaf function, the variable area size 8 is returned.

Then, when returning to the third level, the maximum size of the variable area used by the routine Proc-3 is calculated by adding the variable area size 8 of Proc-5 to the variable area size 4 of Proc-3 to obtain 12. Hence, the maximum values used by Proc-3 and Proc-5 are 12 and 8, respectively.

When returning to the second level, the maximum value of the variable area used by the routine Proc-1 is calculated by adding the maximum value 12 within the maximum area values 12 and 8 of Proc-3 and Proc-5 to the variable area size 6 of Proc-1 to obtain 18. As to the routine Proc-4, the maximum value of the variable area used by Proc-4 is calculated to obtain 10 in the same manner as described above. Hence, the maximum values of the variable areas used by the routines Proc-1, Proc-2, Proc-4, Proc-5, Func-1 and Func-2 are 18, 16, 10, 8, 8 and 2, respectively.

When returning to the first level, the maximum value of the variable area used by the routine main is calculated by adding the maximum value 18 within the maximum variable areas 18, 16, 10, 8, 8 and 2 to the variable area size 2 of the routine main to obtain 20.

In general, the memory size of the high speed access memory 110 provided in the microcomputer is approximately 128 to 256 bytes, and in this embodiment, the maximum size of the variable area of the entire program is 20 bytes which is smaller than the memory size of the high speed access memory 110. Thus the variables can be properly allocated in the high speed access memory 110.

FIG. 4 shows a source program 400 as the content of the input file 101, in which numbers with colon in the left hand side exhibit line numbers.

FIG. 5 shows an object code 500 of the fifth line of the source program 400 shown in FIG. 4, when the variables are allocated in a usual memory, and FIG. 6 shows an object code 600 of the fifth line of the source program 400 shown in FIG. 4, when the variables are allocated in the high speed access memory 110.

The instructions shown in FIGS. 5 and 6 are written according to an instruction set shown in Table 1.

In Table 1, the instruction set possesses the following format:

"mnemonic first operand, second operand"

The movw instruction moves the content of the second operand to the first operand, and the addw instruction adds the content of the second operand to the first operand.

TABLE 1

| INSTRUCTION SET | | |
|---|---|---|
| Instruction set | Byte number | Clock number |
| movw ax, RAM | 2 | 8 |
| movw RAM, ax | 2 | 8 |
| movw ax, MEM | 3 | 12 |
| movw MEM, ax | 3 | 12 |
| movw reg, reg | 2 | 6 |
| addw ax, RAM | 2 | 9 |
| addw reg, reg | 2 | 8 |

RAM: high speed access memory
MEM: usual memory
reg: register
ax: ax register

Further, the variables of totall, data1 and data2 in the source program 400 shown in FIG. 4 correspond to addresses of HR01, HR02 and HR03 in the object code 600 shown in FIG. 6 in the high speed access memory area.

As apparent from Table 1, it is readily understood that the total byte number of the instructions of the object code 500 shown in FIG. 5 is 13 bytes and the total clock number of the same is 50 clocks. In turn, the total byte number of the instructions of the object code 600 shown in FIG. 6 is 6 bytes and the total clock number of the same is 25 clocks.

In this embodiment, as described above, when the maximum size of the variable area of the whole program is smaller than the memory size of the high speed access memory, the variables can be allocated in the high speed access memory, and the object including the high speed variable operation as well as the compact object can be produced.

As described above, according to the present invention, by performing the allocation of the variables in the high speed access memory, which can not be implemented by a microcomputer having a conventional language processing program execution system, not only the object including the high speed variable operation can be produced but also the compact object can be produced. Further, although the variable only in the subroutines are dealt with in the preferred embodiment, variable except the subroutines can be also dealt with in the same manner, and it is possible to allocated all variables within the entire source program in the high speed access memory to obtain more excellent effects and advantages.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A microcomputer having a high speed access memory capable of reading out and writing in data at a high speed and a language processing program execution system for analyzing information of an input source program and outputting object information, the language processing program execution system comprising:

variable memory area analyzing means for calculating variable areas in memory used by subroutines of the source program;

flow graph producing means for producing a flow graph of an interrelation of callings of the subroutines;

maximum variable memory area detecting means for calculating a maximum variable memory area used by a whole program from sizes of the variable memory areas calculated by the variable memory area analyzing means and the flow graph produced by the flow graph producing means; and output means for outputting the object information with variables allocated in the high speed access memory, when the maximum variable area detecting means is smaller than a memory area of the high speed access memory.

2. The microcomputer as claimed in claim 1, wherein the flow graph includes the subroutines composed of parent and children functions and some of the subroutines are leaf functions, and wherein the maximum variable memory area used by each parent function is calculated by considering a number of either its child or children and the maximum variable memory area used by the whole program is calculated by considering the parent and children functions and the leaf functions in the maximum variable memory area detecting means.

* * * * *